No. 771,796.

Patented October 4, 1904.

UNITED STATES PATENT OFFICE.

WILLIAM T. GILMOR, OF JERSEY CITY, NEW JERSEY, ASSIGNOR, BY MESNE ASSIGNMENTS, TO EMPIRE STATE TRUST COMPANY, TRUSTEE, A CORPORATION OF NEW YORK.

BREAD.

SPECIFICATION forming part of Letters Patent No. 771,796, dated October 4, 1904.

Original application filed January 11, 1902, Serial No. 89,290. Divided and this application filed March 17, 1902. Serial No. 98,690. (No specimens.)

*To all whom it may concern:*

Be it known that I, WILLIAM T. GILMOR, a citizen of the United States, residing at Jersey City, county of Hudson, and State of New Jersey, have made a new and useful Invention in Bread, of which the following is a specification.

Many persons prefer that portion of loaf or light bread which has no crust. It is also a well-known fact that in making sandwiches in restaurants, hotels, &c., it is customary to trim off the crust of sliced loaf or light bread before the sandwiches are completed. Such a practice necessarily results in the waste of a very large amount of bread. Light or loaf bread as ordinarily made possesses a dark-brown brittle crust which readily breaks or crumbles, as is well known, and is radically different in its taste from the interior or mass of the loaf—in fact, so different that many persons prefer to eat the outer crust by reason of its peculiar taste and brittleness.

My invention contemplates the making of loaf or light bread without a brittle crust, a type which I denominate as "crustless bread." It is made as follows: I place the dough, such as is ordinarily used in the making of loaf or light bread, preferably in rectangular-shaped pans having tight covers and subject the same as thus inclosed to the action of steam at comparatively low pressure in a steam-oven for the purpose of proofing it. This proofing is continued until the pans are sufficiently filled with the rising dough. This is ascertained by examining from time to time through an opening in the cover of one of the pans as to the condition of the rising dough. When during the process of proofing the pans are found to be sufficiently filled, the oven is closed and the steam again turned on at such pressure or temperature or both as will suggest itself to the baker, it being only necessary in the practice of this method to subject the dough to sufficient heat to obtain the desired result. If the dough has been sufficiently proofed so that the pans are properly filled, the further application of the steam heat expands the same still further, so that the pans are completely filled. The action of the steam heat is then wholly through the walls of the pans, so that all of the exterior sides of the loaf are cooked under exactly the same conditions.

A marked peculiarity of this process lies in the fact that there is no danger of overcooking, as the containing-pans alone are subjected to the direct action of the moist steam heat, and there is no possibility of materially damaging the product by leaving it too long in the oven. I have ascertained that by such a process I am enabled to make a type of bread which when cooked has substantially the same interior appearance when cut or sliced as does bread baked in ovens in the ordinary way, while the exterior surface thereof is in the nature of a thin non-brittle skin which has the same appearance as the interior of the loaf and an additional very important feature in that it constitutes practically an air-tight coating which prevents the moisture of the interior of the loaf from evaporating, and therefore materially increases the length of time for which the same may be kept fresh.

I make no claim in the present application to a method or process by which such bread is made, as this constitutes the subject-matter of a prior application filed by me in the United States Patent Office on the 11th day of January, 1902, bearing Serial No. 89,290, of which application the present application is a division; nor do I limit myself to the hereinbefore-described process of making the product hereinafter claimed, as I believe it is broadly new with me to make loaf or light bread having the same interior appearance as well-known types of loaf or light bread and an exterior non-brittle or skin-like surface.

Having thus described my invention, what I claim, and desire to secure by Letters Patent of the United States, is—

A uniformly-cooked loaf of light bread of uniform appearance over its entire exterior surface, which is of substantially the same color and taste as the interior of the loaf, presenting a very thin skin-like non-brittle exterior, which is less absorbent and more air-excluding than ordinary bread-crust.

In testimony whereof I have signed my name to this specification in the presence of two subscribing witnesses.

WILLIAM T. GILMOR.

Witnesses:
C. J. KINTNER,
M. F. KEATING.